(12) United States Patent
Heilmann et al.

(10) Patent No.: US 7,556,458 B2
(45) Date of Patent: Jul. 7, 2009

(54) TOOL FOR MACHINE TOOLS

(75) Inventors: Juergen Heilmann, Erligheim (DE); Uwe Kretzschmann, Bietigheim-Bissingen (DE); Peter Leuze, Walheim (DE)

(73) Assignee: Komet Group Holding GmbH, Besigheim (DE)

( * ) Notice: Subject to any disclaimer, the term of this patent is extended or adjusted under 35 U.S.C. 154(b) by 381 days.

(21) Appl. No.: 10/546,349

(22) PCT Filed: Mar. 31, 2004

(86) PCT No.: PCT/EP2004/003386
§ 371 (c)(1),
(2), (4) Date: Aug. 18, 2005

(87) PCT Pub. No.: WO2004/087355
PCT Pub. Date: Oct. 14, 2004

(65) Prior Publication Data
US 2006/0159532 A1  Jul. 20, 2006

(30) Foreign Application Priority Data
Apr. 1, 2003  (DE) ............................... 103 14 889

(51) Int. Cl.
*B23B 27/10* (2006.01)
*B23B 51/02* (2006.01)
*B23B 51/06* (2006.01)

(52) U.S. Cl. ..................... 408/59; 408/230; 408/233; 407/11; 407/35

(58) Field of Classification Search ............... 408/59, 408/230, 233, 57, 229, 231, 713; 407/11, 407/35; *B23B 27/10, 51/02, 51/06*
See application file for complete search history.

(56) References Cited

U.S. PATENT DOCUMENTS 2,237,901 A * 4/1941 Chun .......................... 408/59

(Continued)

FOREIGN PATENT DOCUMENTS

DE   42 14 528 A1   11/1992

(Continued)

OTHER PUBLICATIONS

International Search Report dated Aug. 3, 2004 (4 pages).

(Continued)

*Primary Examiner*—David P Bryant
*Assistant Examiner*—Eric A Gates
(74) *Attorney, Agent, or Firm*—Flynn, Thiel, Boutell & Tanis, P.C.

(57) ABSTRACT

A tool includes a shaft and a blade support which is disposed in a removable manner on the face of the shaft, preferably embodied as a drill bit. One end of the blade support is provided with a transversal rib that extends beyond an end face. It can be inserted into an accommodating device of the shaft, which is delimited by a planar counterface, and can be clamped by clamping screws. In order to ensure sufficient torque transmission even with small bore diameters, the accommodating device is provided with two entraining sections that are separated by a central gap, are disposed in a twofold rotationally symmetric manner relative to the tool axis, and protrude from the counterface of the shaft essentially parallel to the axis. Each entraining section encompasses an axially parallel entraining area for an adjacent transversal rib section, which points in the direction of rotation of the shaft.

14 Claims, 5 Drawing Sheets

U.S. PATENT DOCUMENTS

| | | | | |
|---|---|---|---|---|
| 2,640,378 | A * | 6/1953 | Haggar | 408/57 |
| 3,153,356 | A * | 10/1964 | Dearborn | 408/59 |
| 3,293,727 | A * | 12/1966 | Simms | 407/11 |
| RE28,900 | E * | 7/1976 | Byers et al. | 408/201 |
| 4,194,862 | A | 3/1980 | Zweekly | |
| 4,302,135 | A * | 11/1981 | Lillie | 408/59 |
| 4,340,327 | A * | 7/1982 | Martins | 408/59 |
| 4,353,670 | A * | 10/1982 | Jorgensen | 408/193 |
| 4,642,001 | A * | 2/1987 | Gill et al. | 408/59 |
| 4,728,231 | A * | 3/1988 | Kunimori et al. | 408/59 |
| 4,744,704 | A * | 5/1988 | Galvefors, deceased | 408/144 |
| 4,950,108 | A * | 8/1990 | Roos | 408/59 |
| 5,425,604 | A | 6/1995 | Scheer et al. | |
| 5,599,145 | A * | 2/1997 | Reinauer et al. | 408/233 |
| 5,904,455 | A * | 5/1999 | Krenzer et al. | 408/144 |
| 5,971,673 | A * | 10/1999 | Berglund et al. | 408/1 R |
| 5,980,166 | A * | 11/1999 | Ogura | 408/57 |
| 5,988,953 | A * | 11/1999 | Berglund et al. | 408/1 R |
| 6,012,881 | A | 1/2000 | Scheer | |
| 6,059,492 | A * | 5/2000 | Hecht | 408/144 |
| 6,095,725 | A | 8/2000 | Stahl | 408/223 |
| 6,299,180 | B1 * | 10/2001 | Satran et al. | 279/83 |
| 6,481,938 | B2 * | 11/2002 | Widin | 408/226 |
| 6,485,235 | B1 | 11/2002 | Mast et al. | |
| 6,540,452 | B1 * | 4/2003 | Bolkart et al. | 408/230 |
| 6,551,036 | B2 * | 4/2003 | Heule | 408/227 |
| 6,582,164 | B1 * | 6/2003 | McCormick | 408/226 |
| 6,626,614 | B2 * | 9/2003 | Nakamura | 408/59 |
| 6,848,869 | B2 * | 2/2005 | Stokey | 408/227 |
| 7,011,478 | B2 * | 3/2006 | Stokey et al. | 408/227 |
| 7,131,799 | B2 * | 11/2006 | Stokey et al. | 408/230 |
| 7,182,556 | B2 * | 2/2007 | Takiguchi et al. | 408/59 |
| 7,311,480 | B2 * | 12/2007 | Heule et al. | 408/233 |
| 2003/0103824 | A1 * | 6/2003 | Hansson et al. | 408/231 |
| 2005/0186042 | A1 * | 8/2005 | Hansson | 408/231 |
| 2006/0093449 | A1 * | 5/2006 | Hecht et al. | 408/231 |
| 2008/0193238 | A1 * | 8/2008 | Hecht | 408/230 |

FOREIGN PATENT DOCUMENTS

| | | |
|---|---|---|
| DE | 44 40 480 C2 | 5/1996 |
| DE | 10054850 A1 * | 5/2002 |
| EP | 358901 A1 * | 3/1990 |
| JP | 2001038519 A * | 2/2001 |
| JP | 2003291013 A * | 10/2003 |
| JP | 2004160571 A * | 6/2004 |
| JP | 2004276134 A * | 10/2004 |
| JP | 2005144655 A * | 6/2005 |
| JP | 2006167871 A * | 6/2006 |

OTHER PUBLICATIONS

German Search Report dated dated Sep. 19, 2003 (3 pages).

* cited by examiner

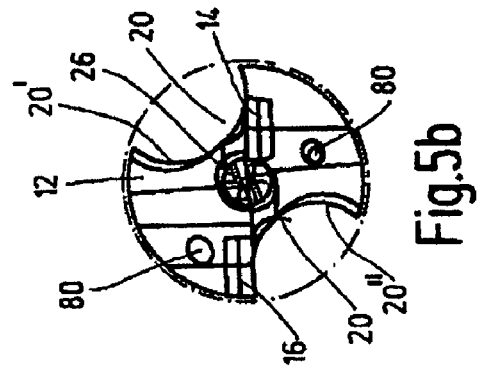
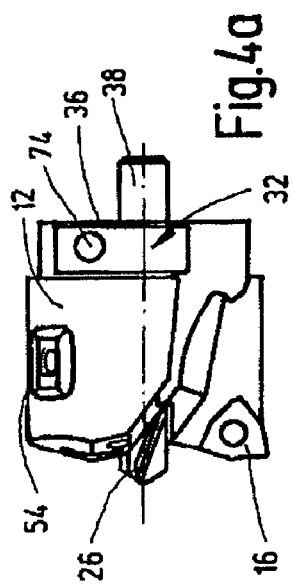
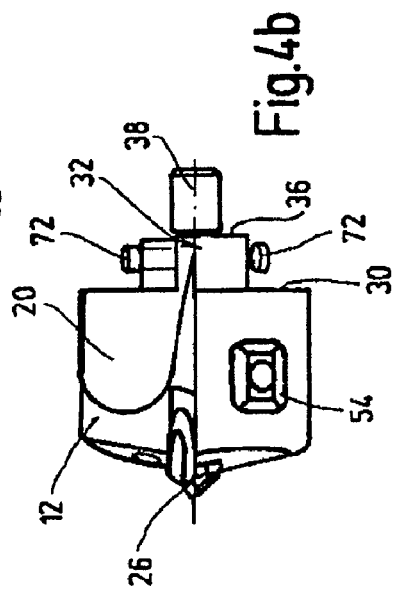
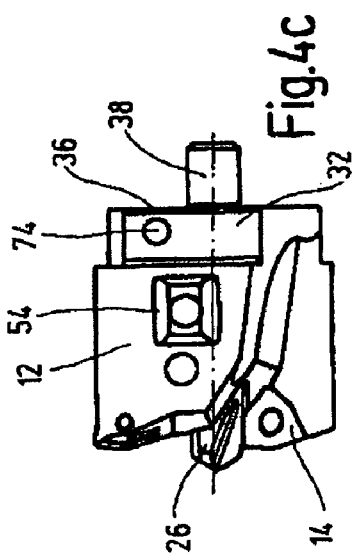
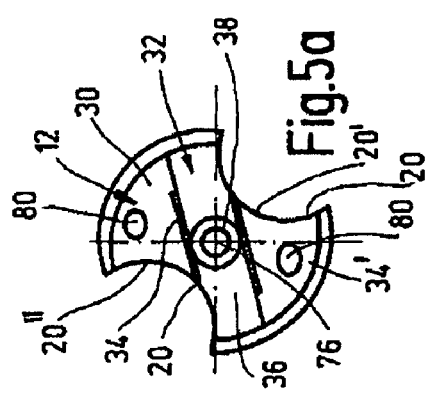

TOOL FOR MACHINE TOOLS

FIELD OF THE INVENTION

The invention relates to a tool for machine tools having a shank and a cutting-edge carrier, which is arranged removably at the end side of the shank, is preferably designed as a drill bit and at one end has a transverse rib, which projects beyond a flat surface, can be introduced into a receiving part, delimited by a planar mating surface, of the shank and can be clamped fixedly in place by means of tightening screws, and a centering pin, which can be fitted into a central locating hole in the shank and projects axially centrally beyond the transverse rib, the cutting-edge carrier and the shank each having two chip removal grooves which merge into one another and are preferably helical.

BACKGROUND OF THE INVENTION

A drilling tool of this type is known (DE-A-4214528); in this drilling tool, the transverse rib arranged on the cutting-edge carrier engages in a transverse groove, which is oriented radially at the end side of the shank and is delimited on both sides by flanks, and in this transverse groove are pressed, by means of tightening screws engaging through one of the groove flanks, onto the opposite groove flank. It is considered disadvantageous that the groove flanks, in particular for relatively small shank diameters, are relatively thin-walled, which means that only relatively low torques can be transmitted. In addition, the tightening screws, which are designed as pressure screws, do not have any reinforcing action in the connection region.

SUMMARY OF THE INVENTION

Working on this basis, the invention is based on the object of improving the known machine tool of the type described in the introduction in such a way that the connection between shank and cutting-edge carrier increases the torques which can be transmitted.

To achieve this object, the invention proposes the combination of features given in the claims. Advantageous configurations and refinements of the invention will emerge from the dependent claims.

The solution according to the invention substantially consists in the fact that the receiving part has two driver parts, which are separated from one another by a central gap, are arranged with double rotational symmetry with respect to one another about the tool axis, project in a substantially axially parallel manner beyond the mating surface of the shank and each have an axially parallel driver surface, facing in the direction of rotation of the shank, for an adjacent transverse rib part, a preferably concave chip removal surface, which adjoins the driver surface at an acute angle and is designed as part of the chip removal flute, and a part-cylindrical outer surface, which connects the driver surface and the chip removal surface to one another on the radially outer side and is preferably concentric with respect to the tool axis, that the transverse rib part, on its side remote from the driver surface of the one driver part, has a preferably concave chip removal surface, which adjoins the concave chip removal surface of the other driver part, is complemented by it and is designed as part of the chip removal flute, and that the tightening screws engage, through in each case one transverse bore in one of the driver parts, into a threaded bore of the adjacent transverse rib part. The result of the measures according to the invention is that the driver parts of the shank are of sufficiently thick-walled design to be able to receive even high torques during the drilling operation. According to the invention, a further improvement in this respect is achieved by virtue of the fact that the transverse rib is pressed onto the driver surfaces of the adjacent driver parts via the tightening screws.

A preferred configuration of the invention provides that the transverse bores have an inner cone, into which the tightening screws, which have a conical countersunk head, can be drawn, so as to produce flat-surface clamping between the flat surface of the transverse rib and the mating surface of the receiving part. This feature provides additional reinforcing of the parting point between shank and cutting-edge carrier. The cutting-edge carrier advantageously has a receiving part for a disposable tip in the region of its chip removal grooves. Furthermore, the cutting-edge carrier is expediently provided with a central axial bore for receiving an axially projecting center drill. The center drill can expediently be positioned in the axial direction by way of a setscrew which engages obliquely into the cutting-edge carrier, and can be fixed on the cutting-edge carrier by way of at least one transverse screw. To achieve sufficient cooling and lubrication of the drill tip and improved chip removal, according to a preferred configuration of the invention it is proposed that the centering pin has a central groove which leads to the center drill and can be supplied with coolant via the shank. A further improvement in this respect is achieved by virtue of the fact that the driver parts and the cutting-edge carrier have bores which are in communication with one another and can be supplied with coolant via the shank.

To allow through-drilling operations even for a great drilling depth, according to an advantageous configuration of the invention it is proposed that the cutting-edge body, in the region of its part-cylindrical circumferential surfaces, has, at an axial distance from its end face, two radially projecting guide elements arranged at an angle spacing ≠180°. To cool and lubricate the guide elements bearing against the drill-hole wall, these guide elements are supplied with coolant via branch bores in the cutting-edge carrier. This also prevents chips from accumulating in the region of the guide elements.

BRIEF DESCRIPTION OF THE DRAWINGS

The text which follows provides a more detailed explanation of the invention on the basis of an exemplary embodiment diagrammatically depicted in the drawing, in which:

FIGS. 4a to c show three side views of the drill bit in different rotational positions;

FIGS. 5a and b show a plan view and a bottom view of the cutting-edge carrier;

DETAILED DESCRIPTION OF THE INVENTION

Figure 1:
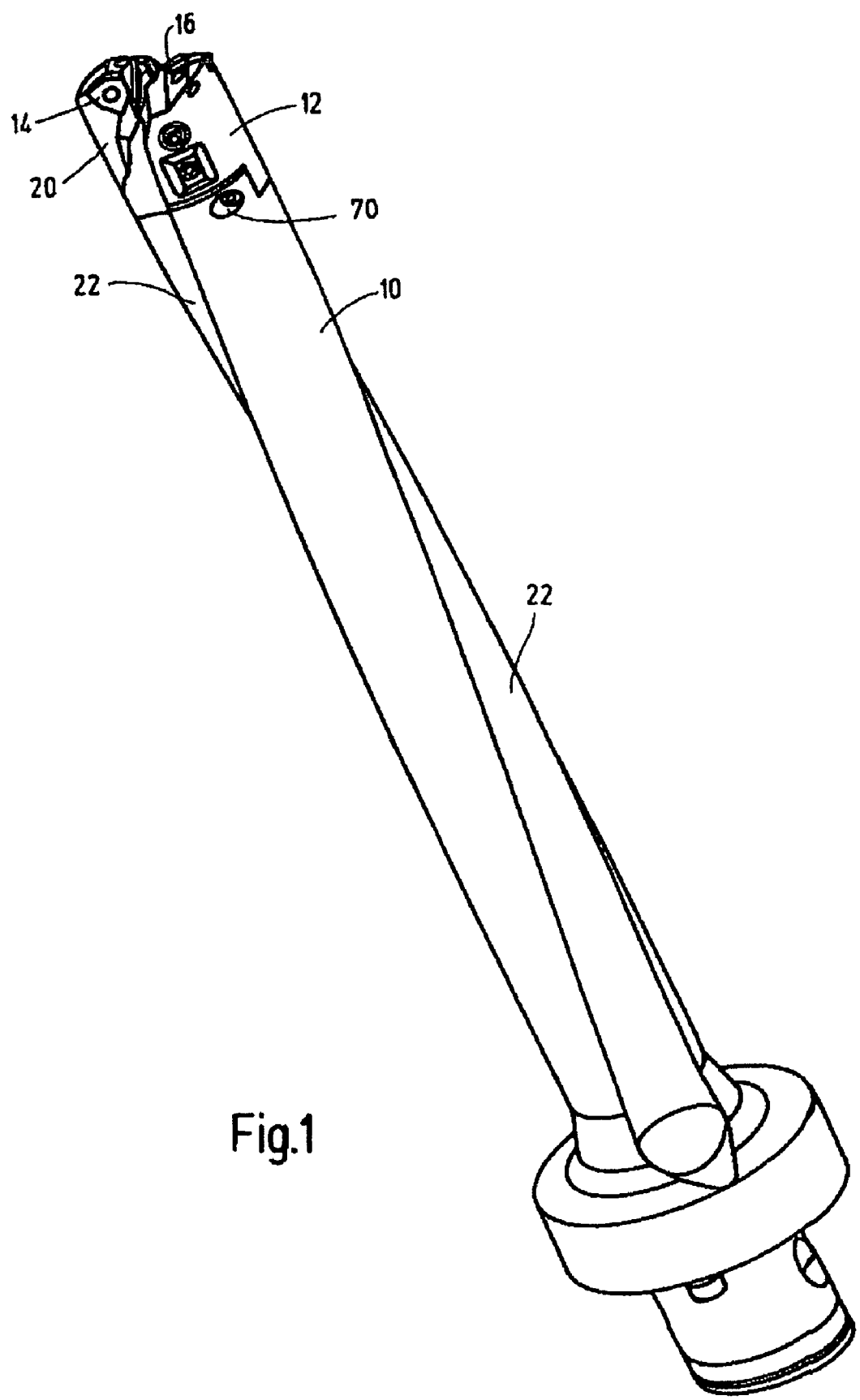
FIG. 1 shows a diagrammatic illustration of a side view of a drilling tool with a long shank and a drill bit.
Figure 2:
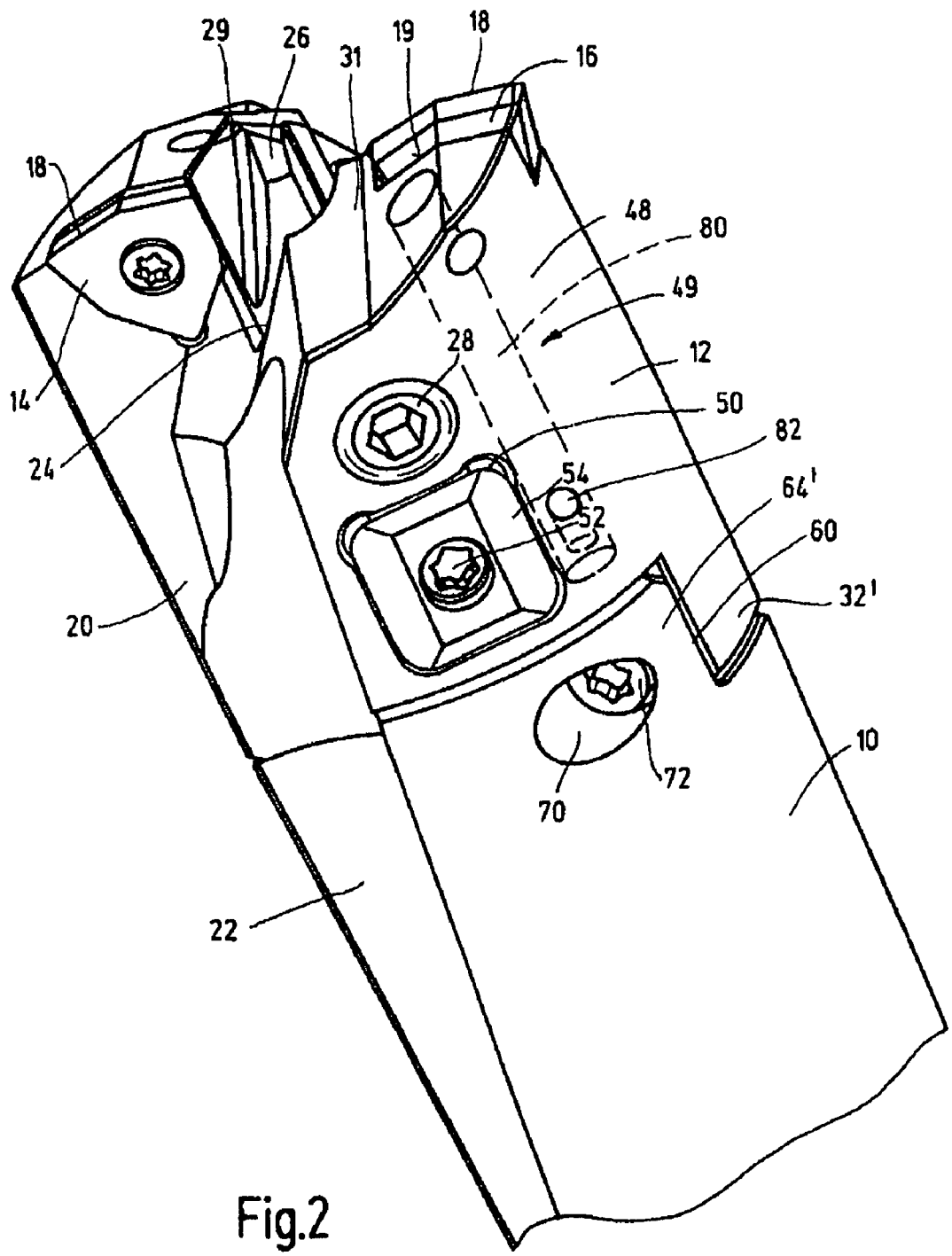
FIG. 2 shows an enlarged excerpt from FIG. 1.
Figure 3:
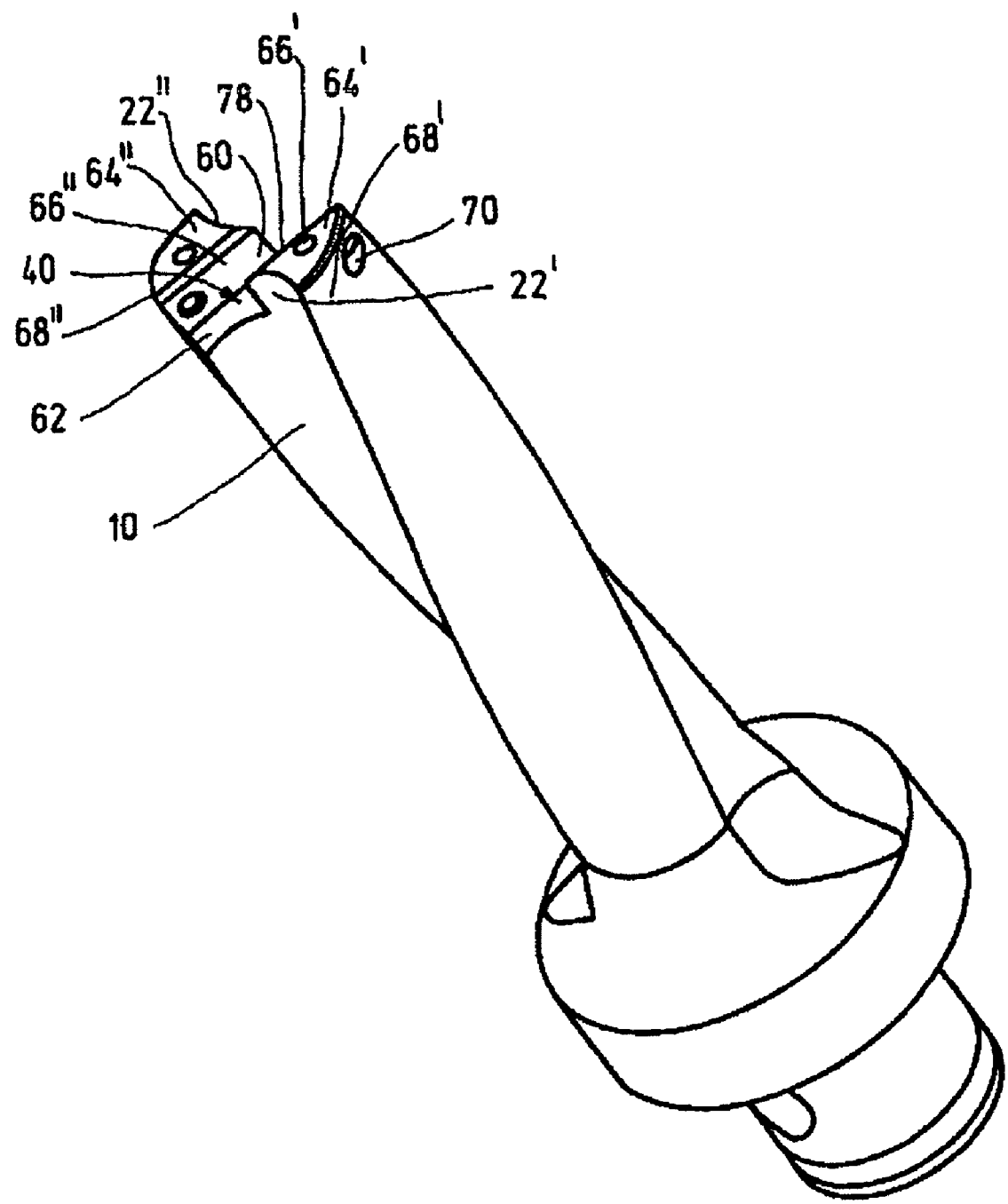
FIG. 3 shows a diagrammatic illustration of the shank without the drill bit.
Figure 6:
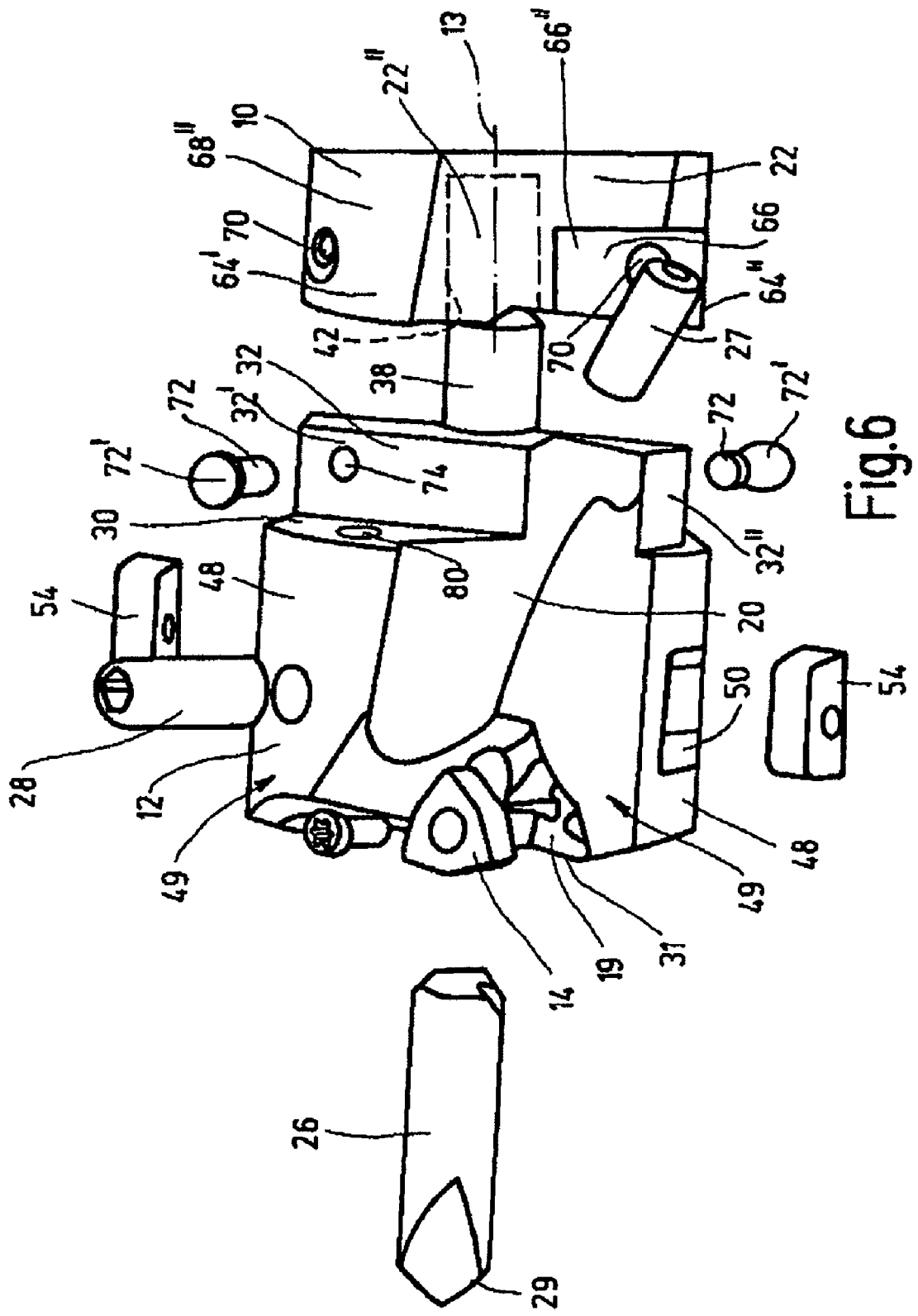
FIG. 6 shows a side view, in exploded format, of the cutting-edge carrier together with the end of the shank.

The drilling tool illustrated in the drawing substantially comprises a shank 10 and a cutting-edge carrier which is positively and non-positively connected to the end side of the shank 10 and is designed as a drill bit 12. The drill bit 12 has two hexagonal disposable cutting tool tips 14, 16, which are arranged at different radial distances from the shank axis 13 and project beyond the end side of the drill bit 12 by way of, in each case, two cutting edges 18 which include an angle of from 120° to 160° with one another. The disposable cutting tool tips are arranged in such a way that their active cutting edges 18 partially overlap one another in the radial direction in their working regions. They are, in each case, arranged in cutouts 19 in an axially parallel flank of a chip removal groove 20 of the drill bit 12, which at its rear end opens out into a helically running chip removal groove 22 of the shank 10. In addition, in an axially central bore 24 of the drill bit 12 there is arranged a center drill 26, which can be adjusted in the axial direction by means of an adjustment screw 27 which can be screwed obliquely into the drill bit and can be fixed to the drill bit 12 by means of a fixing screw 28; the tip 29 of this center drill 26 projects axially beyond the end face 31 of the drill bit 12 and the cutting edges 18 of the disposable cutting tool tips 14, 16.

On the rear side, the drill bit 12 has a transverse rib 32, which projects beyond a flat surface 30, is delimited by two lateral flanks 34, 34' and a planar end face 36 and in the middle of its end faces 36 has a locating pin 38 projecting axially centrally. In the exemplary embodiment shown, the locating pin 38 is formed integrally on the drill bit 12. The transverse rib 32 can be inserted into a corresponding receiving part 40 arranged at the end side of the shank 10, while the locating pin 38 engages into an axially central locating bore 42 in the shank. The receiving part 40 has two driver parts 64', 64", which are separated from one another by a central gap 60, are arranged with double rotational symmetry ($C_2$ symmetry) with respect to the tool axis 13, project substantially axially parallel beyond the mating surface 62 of the shank 10 and each have an axially parallel driver surface 66', 66", facing in the direction of rotation of the shank, for an adjacent transverse rib part 32', 32", a concave chip removal surface 22', 22", which adjoins the driver surface 66', 66" at an acute angle and is designed as part of the chip removal flute and a part-cylindrical outer surface 68', 68", which connects the driver surface and the chip removal surface to one another on the radially outer side and is concentric with respect to the tool axis. On its side remote from the driver surface 66', 66" of one driver part 64', 64", each transverse rib part 32', 32" has a concave chip removal surface 20', 20", which adjoins the concave chip removal surface of the other driver part, complements it and is designed as part of the chip removal flute 20. The driver parts 64', 64" each have a transverse bore 70, through which in each case one tightening screw 72 engages into a threaded bore 74 in the adjacent transverse rib part 32', 32". The transverse rib 32 and the driver parts 64', 64" are pressed together by the tightening screws 72. In addition, the transverse bores 70 have an inner cone, into which the tightening screws 72, which have a conical countersunk head 72', can be drawn, so as to produce flat-surface clamping between the end face 36 of the transverse rib 32 and the mating surface 62 of the receiving part 40.

The drill bit 12 is delimited by two diametrically opposite webs 49 with circumferential surfaces 48 in the shape of part of a circle, in each of which there is a recess 50 for receiving a guide element 54 which can be locked by means of a clamping screw 52. The guide elements 54 are set back in the axial direction with respect to the end face 31 of the drill bit and are at an axial distance from one another (cf. FIGS. 4b and c). The angle spacing between them is ≠180°. The guide elements 54 are also arranged circumferentially offset with respect to the disposable cutting tool tips 14, 16 (cf. FIGS. 4a to c).

The locating pin 38 has a central bore 76 which leads to the center drill 26 and can be supplied with coolant via the shank. Furthermore, the driver parts 64', 64" and the cutting-edge carrier 12 are connected by bores 78, 80 which are in communication with one another and can be supplied with coolant via the shank. Moreover, the bores 80 have branch bores 82 which emerge at the cutting-edge carrier surface in the vicinity of, in each case, one of the guide elements 54. These measures ensure sufficient cooling and lubrication of the drill bit in the region of the cutting edges and of the guide elements and also ensure good chip removal.

The following statements can be made in summary: the invention relates to a tool having a shank and a cutting-edge carrier 12, which is arranged removably at the end side of the shank 10 and is preferably designed as a drill bit. The cutting-edge carrier 12 at one end has a transverse rib 32 which projects beyond a flat surface 30, can be introduced into a receiving part 40, delimited by a planar mating surface 62, of the shank 10 and can be clamped fixedly in place by means of tightening screws 72. To enable sufficient torque transmission to be ensured even with small drill diameters, according to the invention it is proposed that the receiving part has two driver parts 64', 64", which are separated from one another by a central gap 60, are arranged with double rotational symmetry with respect to one another about the tool axis 13, project in a substantially axially parallel manner beyond the mating surface 62 of the shank 10 and each have an axially parallel driver surface 66', 66", facing in the direction of rotation of the shank 10, for an adjacent transverse rib part 32', 32". The transverse rib part 32', 32", on its side remote from the driver surface 66', 66" of one driver part 64', 64", has a chip removal surface 20', 20". The tightening screws 72 engage, through in each case one transverse bore 70 in one of the driver parts 64', 64", into a threaded bore 74 in the adjacent transverse rib part 32', 32". In addition, the tightening screws 72 produce flat-surface clamping between the end face 36 of the transverse rib 32 and the mating surface 62 of the receiving part 64.

The invention claimed is:

1. A tool for machine tools having a shank and a cutting-edge carrier, which is arranged removably at an end side of the shank, and at one end has a transverse rib, which projects beyond a flat surface, can be introduced into a rib receiving part, delimited by a planar mating surface, of the shank and can be clamped fixedly in place by tightening screws, and a centering pin, which can be fitted into a central locating hole in the shank and projects axially centrally beyond the transverse rib, the cutting-edge carrier and the shank each having two chip removal grooves which merge into one another and are helical, wherein the receiving part has two driver parts, which are separated from one another by a central gap, are arranged with double rotational symmetry with respect to one another about the tool axis, project in a substantially axially parallel manner beyond the mating surface of the shank and each have an axially parallel driver surface, acting in the direction of rotation of the shank, for receiving an adjacent transverse rib part of the cutting edge carrier, wherein the receiving part includes a concave chip removal surface, which adjoins the driver surface at an acute angle and is designed as part of the chip removal flute, and a part-cylindrical outer surface, which connects the driver surface and the chip removal surface to one another on the radially outer side of the shank and is concentric with respect to the tool axis, wherein the transverse rib part of the cutting-edge carrier, on its side remote from the driver surface of the one driver part of the shank, includes a concave chip removal surface, which adjoins the concave chip removal surface of the other driver part, is complemented by the other driver part of the shank and is designed as part of the chip removal flute, and wherein the tightening screws engage, through in each case one transverse bore in each one of the driver parts of the shank, into a threaded bore in the adjacent transverse rib part of the cutting-edge carrier.

2. The tool as claimed in claim 1, wherein the transverse bores have an inner cone, into which the tightening screws, which have a conical countersunk head, are drawn, so as to produce flat-surface clamping between an end face of the transverse rib and the mating surface of the receiving part of the shank.

3. The tool as claimed in claim 1, wherein the driver parts of the shank and the cutting-edge carrier each have bores which are in communication with one another for receiving coolant via the shank.

4. A tool for machine tools having a shank and a cutting-edge carrier, which is arranged removably at an end side of the shank, and at one end has a transverse rib, which projects beyond a flat surface, can be introduced into a rib receiving part, delimited by a planar mating surface, of the shank and can be clamped fixedly in place by tightening screws, and a centering pin, which can be fitted into a central locating hole in the shank and projects axially centrally beyond the transverse rib, the cutting-edge carrier and the shank each having two chip removal grooves which merge into one another and are helical, wherein the receiving part has two driver parts, which are separated from one another by a central gap, are arranged with double rotational symmetry with respect to one another about the tool axis, project in a substantially axially parallel manner beyond the mating surface of the shank and each have an axially parallel driver surface, acting in the direction of rotation of the shank, for receiving an adjacent transverse rib part of the cutting edge carrier, wherein the receiving part includes a concave chip removal surface, which adjoins the driver surface at an acute angle and is designed as part of the chip removal flute, and a part-cylindrical outer surface, which connects the driver surface and the chip removal surface to one another on the radially outer side of the shank and is concentric with respect to the tool axis, wherein the transverse rib part of the cutting-edge carrier, on its side remote from the driver surface of the one driver part of the shank, includes a concave chip removal surface, which adjoins the concave chip removal surface of the other driver part, is complemented by the other driver part of the shank and is designed as part of the chip removal flute, wherein the tightening screws engage, through in each case one transverse bore in each one of the driver parts of the shank, into a threaded bore in the adjacent transverse rib part of the cutting-edge carrier, and wherein the cutting-edge carrier, in the region of each chip removal groove, has a cutout for receiving a disposable cutting tool tip.

5. A tool for machine tools having a shank and a cutting-edge carrier, which is arranged removably at an end side of the shank, and at one end has a transverse rib, which projects beyond a flat surface, can be introduced into a rib receiving part, delimited by a planar mating surface, of the shank and can be clamped fixedly in place by tightening screws, and a centering pin, which can be fitted into a central locating hole in the shank and projects axially centrally beyond the transverse rib, the cutting-edge carrier and the shank each having two chip removal grooves which merge into one another and are helical, wherein the receiving part has two driver parts, which are separated from one another by a central gap, are arranged with double rotational symmetry with respect to one another about the tool axis, project in a substantially axially parallel manner beyond the mating surface of the shank and each have an axially parallel driver surface, acting in the direction of rotation of the shank, for receiving an adjacent transverse rib part of the cutting edge carrier, wherein the receiving part includes a concave chip removal surface, which adjoins the driver surface at an acute angle and is designed as part of the chip removal flute, and a part-cylindrical outer surface, which connects the driver surface and the chip removal surface to one another on the radially outer side of the shank and is concentric with respect to the tool axis, wherein the transverse rib part of the cutting-edge carrier, on its side remote from the driver surface of the one driver part of the shank, includes a concave chip removal surface, which adjoins the concave chip removal surface of the other driver part, is complemented by the other driver part of the shank and is designed as part of the chip removal flute, wherein the tightening screws engage, through in each case one transverse bore in each one of the driver parts of the shank, into a threaded bore in the adjacent transverse rib part of the cutting-edge carrier, and wherein the cutting-edge carrier has a central bore for receiving an axially projecting center drill.

6. The tool as claimed in claim 5, wherein the cutting-edge carrier engages in a locating bore in the shank by way of a locating pin which projects axially centrally on the transverse rib.

7. The tool as claimed in claim 6, wherein the locating pin has a central bore which leads to the center drill and can be supplied with coolant via the shank.

8. The tool as claimed in claim 5, wherein the center drill can be positioned in the axial direction by a setscrew which engages obliquely into the cutting-edge carrier, and can be fixed on the cutting-edge carrier by way of at least one transverse screw.

9. A tool for machine tools having a shank and a cutting-edge carrier, which is arranged removably at an end side of the shank, and at one end has a transverse rib, which projects beyond a flat surface, can be introduced into a rib receiving part, delimited by a planar mating surface, of the shank and can be clamped fixedly in place by tightening screws, and a centering pin, which can be fitted into a central locating hole in the shank and projects axially centrally beyond the transverse rib, the cutting-edge carrier and the shank each having two chip removal grooves which merge into one another and are helical, wherein the receiving part has two driver parts, which are separated from one another by a central gap, are arranged with double rotational symmetry with respect to one another about the tool axis, project in a substantially axially parallel manner beyond the mating surface of the shank and each have an axially parallel driver surface, acting in the direction of rotation of the shank, for receiving an adjacent transverse rib part of the cutting edge carrier, wherein the receiving part includes a concave chip removal surface, which adjoins the driver surface at an acute angle and is designed as part of the chip removal flute, and a part-cylindrical outer surface, which connects the driver surface and the chip removal surface to one another on the radially outer side of the shank and is concentric with respect to the tool axis, wherein the transverse rib part of the cutting-edge carrier, on its side remote from the driver surface of the one driver part of the shank, includes a concave chip removal surface, which adjoins the concave chip removal surface of the other driver part, is complemented by the other driver part of the shank and is designed as part of the chip removal flute, wherein the tightening screws engage, through in each case one transverse bore in each one of the driver parts of the shank, into a threaded bore in the adjacent transverse rib part of the cutting-edge carrier, and wherein the cutting-edge carrier, in the region of a part-cylindrical circumferential surface thereof, has, at an axial distance from an end face, two radially projecting guide elements arranged at an angle spacing $\neq 180°$.

10. The tool as claimed in claim 9, wherein the guide elements are capable of receiving coolant via branch bores in the cutting-edge carrier.

11. A tool for machine tools having a shank with a chip removal groove extending along a length thereof, and at a first shank end receiving a cutting edge carrier, the shank at the first end comprising:
- a rib receiving part having a mating surface and including a receiver chip removal groove and two driver parts with rotational symmetry with respect to the tool axis, the driver parts projecting axially beyond the mating surface and separated from one another by a central gap, each said driver part having an axially parallel driver surface facing in the direction of rotation of the shank and a radially oriented driver bore; and
- an axially oriented central locating bore;
- the cutting edge carrier at a first carrier end for mounting to the end of the shank, comprising:
- a transverse rib projecting axially beyond a surface for introduction into the central gap of the rib receiving part of the shank and for bearing against the mating surface, the transverse rib having a concave rib chip removal groove formed for merging into the receiver chip removal groove of the rib receiving part when mounted thereto, and said transverse rib comprising first and second rib parts, each said rib part having a radially oriented threaded bore; and
- a centering pin projecting axially outwardly beyond the transverse rib for fitting into the central locating bore;
- a pair of tightening screws, each said screw engaging one of the transverse driver bores of one of the driver parts and a respective said threaded bore to join the cutting-edge carrier to the shank.

12. A tool for machine tools having a shank with a chip removal groove extending along a length thereof, and at a first shank end receiving a cutting edge carrier, the shank at the first end comprising:
- a rib receiving part having a mating surface and including a receiver chip removal groove and two driver parts with rotational symmetry with respect to the tool axis, the driver parts projecting axially beyond the mating surface and separated from one another by a central gap, each said driver part having an axially parallel driver surface facing in the direction of rotation of the shank;
- the cutting edge carrier at a first carrier end for mounting to the end of the shank, comprising:
- a transverse rib projecting axially beyond a surface for introduction into the central gap of the rib receiving part of the shank and for bearing against the mating surface, the transverse rib having a concave rib chip removal groove formed for merging into the receiver chip removal groove of the rib receiving part when mounted thereto, and first and second hexagonal cutting tool tips mounted at a second opposing end of the cutting-edge carrier.

13. A tool for machine tools having a shank with a chip removal groove extending along a length thereof, and at a first shank end receiving a cutting edge carrier, the shank at the first end comprising:
- a rib receiving part having a mating surface and including a receiver chip removal groove and two driver parts with rotational symmetry with respect to the tool axis, the driver parts projecting axially beyond the mating surface and separated from one another by a central gap, each said driver part having an axially parallel driver surface facing in the direction of rotation of the shank;
- the cutting edge carrier at a first carrier end for mounting to the end of the shank, comprising:
- a transverse rib projecting axially beyond a surface for introduction into the central gap of the rib receiving part of the shank and for bearing against the mating surface, the transverse rib having a concave rib chip removal groove formed for merging into the receiver chip removal groove of the rib receiving part when mounted thereto, and
- a central bore for receiving an axially projecting center drill.

14. The tool as claimed in claim 13, wherein the center drill is positioned in the axial direction by a setscrew which engages obliquely into the cutting-edge carrier, and is fixed on the cutting-edge carrier by way of at least one transverse screw.

* * * * *